April 21, 1959 M. OLLEY ET AL 2,883,232
VEHICLE CONSTRUCTION
Filed Jan. 13, 1955 3 Sheets-Sheet 3
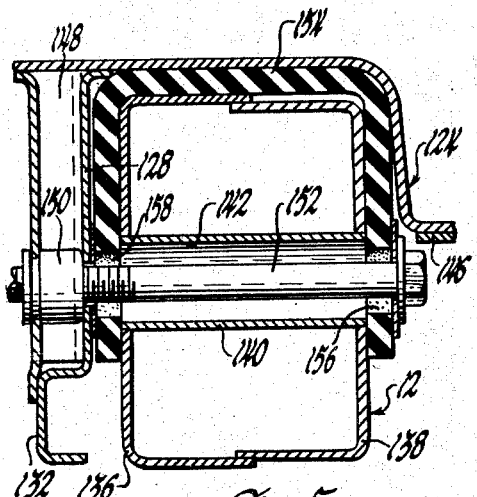
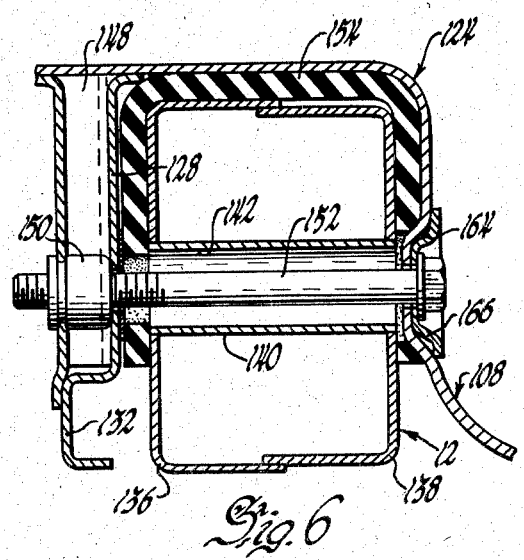
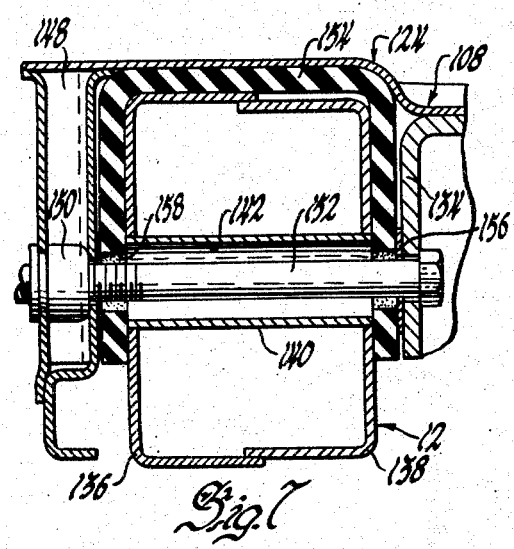
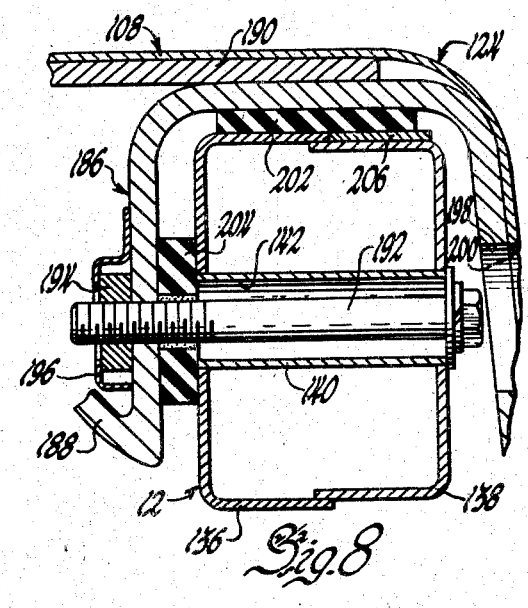
INVENTORS
Maurice Olley,
Frederick C. Mather &
William S. Wolfram
BY L. D. Burch
ATTORNEY

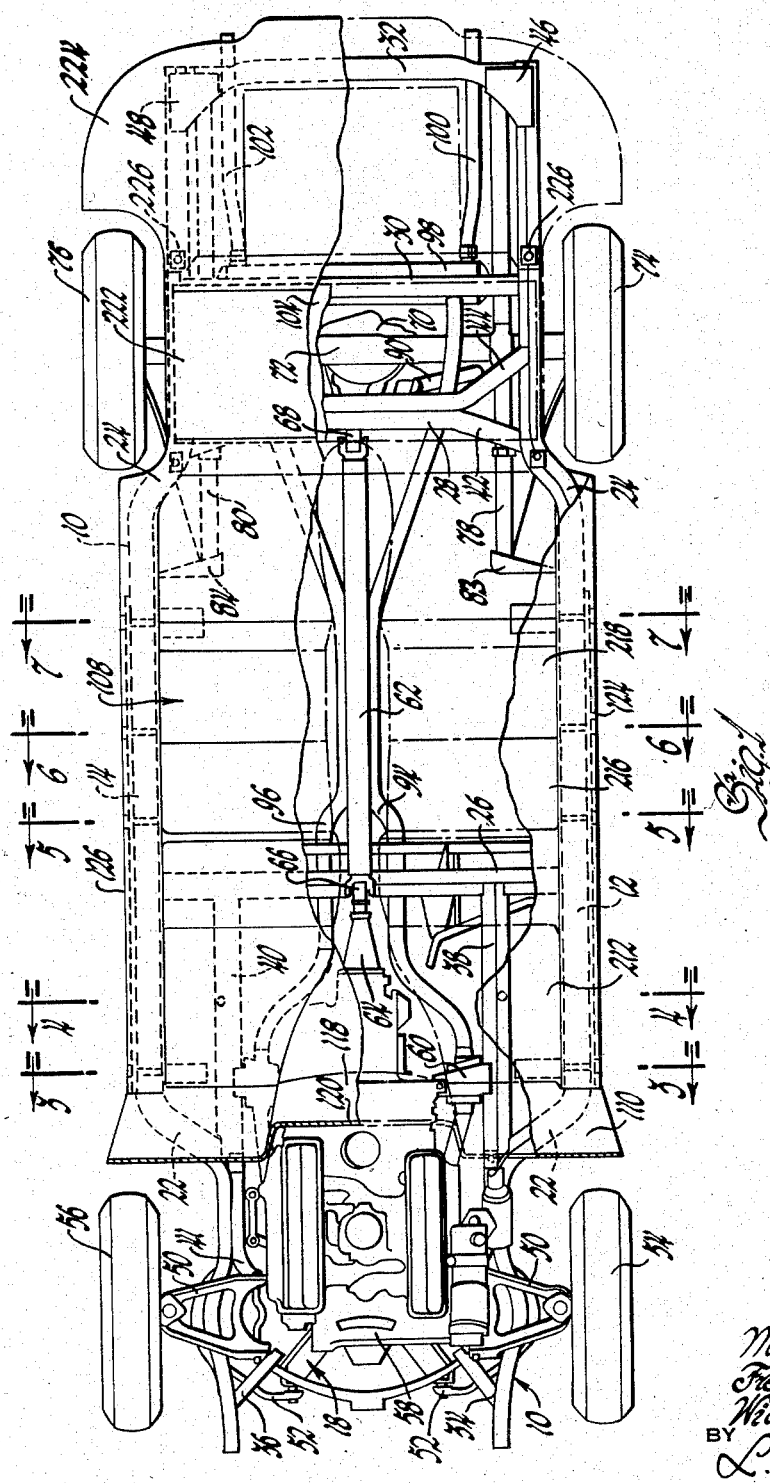

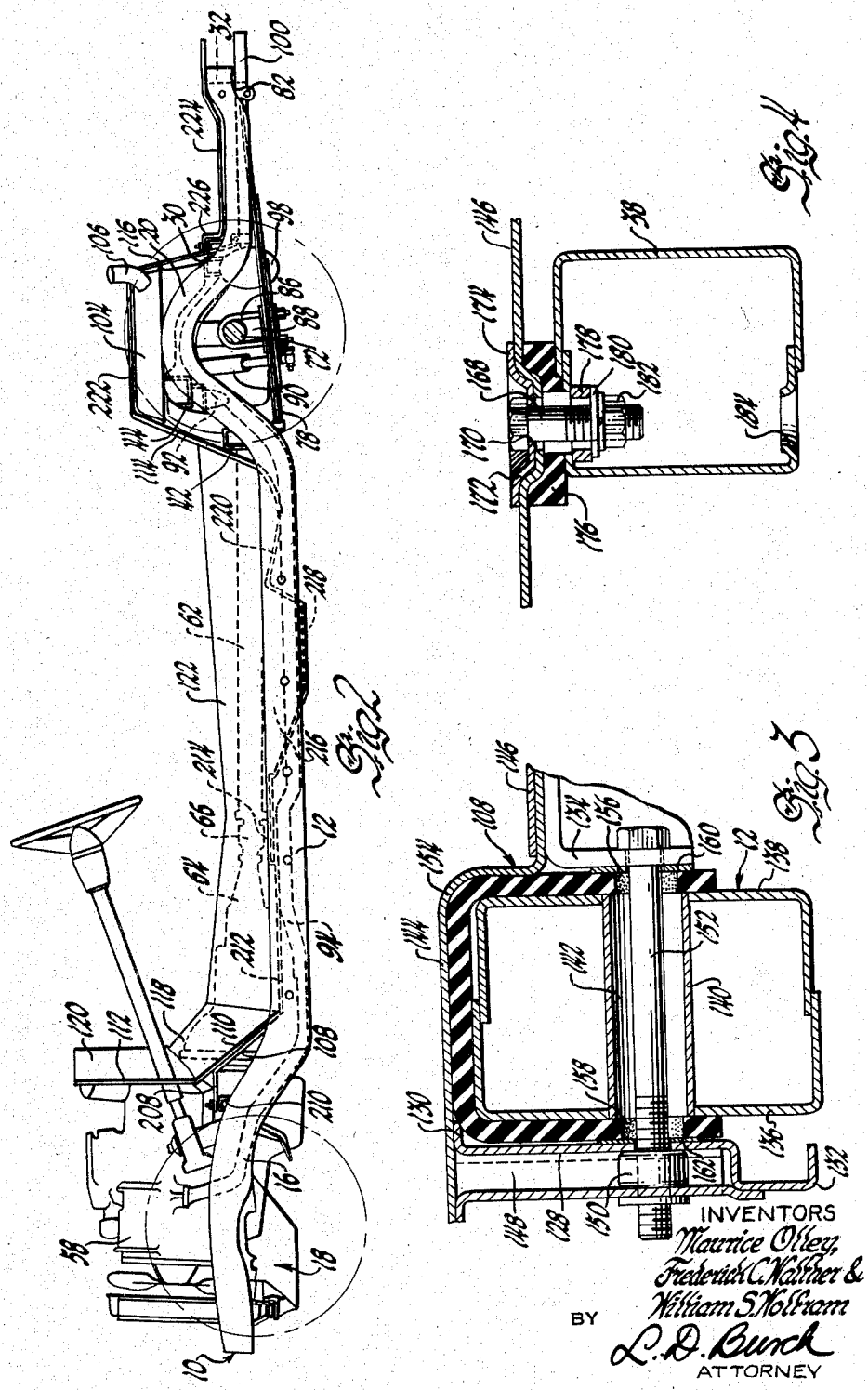

United States Patent Office 2,883,232
Patented Apr. 21, 1959

2,883,232

VEHICLE CONSTRUCTION

Maurice Olley, Detroit, Frederick C. Walther, Grosse Pointe, and William S. Wolfram, Birmingham, Mich., assignors to General Motors Corporation, Detroit, Mich., a corporation of Delaware Application January 13, 1955, Serial No. 481,672

9 Claims. (Cl. 296—28)

This invention relates to vehicle chassis generally and more particularly to vehicle frames and underbodies.

In the past, vehicle bodies have been mounted upon vehicle frames and outriggers as required to support the body above the frame members. In an attempt to lower the vehicle center of gravity, frames have been dropped as much as possible and provided with both front and rear kick-up sections to accommodate axle shafts and the like. In racing and sport cars the vehicle frames and underbodies have been made integral with the body itself in some instances and adapted to receive the body over the integral frame and underbody in others. This allows for a much lower body-frame construction and a lower center of gravity but is quite expensive for production use under present manufacturing conditions. There is needed a compromise between present production body mounting and the integral construction and one which will allow a lower mounting of the vehicle body, including the underbody, upon the vehicle frame.

In lowering the vehicle body, road clearance may be sacrificed to some extent and chassis components previously located under the vehicle underbody must be relocated within the space left available. Such components include the engine fuel tank, exhaust conduits, exhaust muffler and silencer and the like.

It is now proposed to provide a vehicle frame and underbody construction which allows the vehicle body to be mounted lower upon the vehicle frame than has previously been possible. It is proposed to provide a vehicle underbody which may be part of the vehicle body or separate therefrom, and which includes channel sections formed along opposite sides thereof that are received over the vehicle frame side rails. The channel sections allow the vehicle underbody to be disposed lower thereby providing a lower floor level within the passenger compartment of the vehicle. The underbody may be disposed as low as the bottom of the frame side rails without decreasing the available road clearance or even lower if less road clearance is required. The underbody may be formed to provide little or no drop within the front seat area and an appreciable amount within the rear seat area if desired.

The mounting of the underbody to the vehicle frame is preferably by fastening means extended through the underbody channel section and the frame member. Rubber mounting pads are advisedly disposed between the underbody and frame member to absorb shock forces and dissipate vibrations otherwise conveyed from the vehicle frame to the vehicle body.

It is proposed to provide an underbody which in combination with the vehicle frame will provide a much lower vehicle compartment floor while still accommodating the drive shaft and exhaust conduits thereunder. It is proposed to provide a drive shaft tunnel within which the exhaust conduits may travel the length of the passenger compartment without requiring a higher floor level or decreasing the available road clearance. It is further proposed to relocate the exhaust muffler and silencer assembly transversely of the vehicle chassis and in the vicinity of the rear axle frame kick-up. The engine fuel tank is also relocated and is proposed to be mounted over the rear axle and upon the vehicle frame rear kick-up. Such disposition enables the tank filler neck to be readily accessible and positions the tank beyond the danger of damage.

In the drawings:

Figure 1 is a top elevation view of a vehicle chassis having parts broken away to better show the present invention as incorporated therewith.

Figure 2 is a side view of the vehicle chassis shown by Figure 1.

Figures 3–7 are cross-sectional views taken in the planes of lines 3—3 through 7—7, respectively, of Figure 1 looking in the direction of the arrows thereon and showing the vehicle underbody-to-frame mounting means.

Figure 8 is a cross-sectional view of an optional type of vehicle underbody-to-frame mounting means.

The vehicle chassis shown by the drawings includes a vehicle frame 10 having side rails 12 and 14 which are swept up near the front of the chassis as at 16 to accommodate the front wheel suspension assembly 18 and are kicked up near the rear of the chassis as at 20 to accommodate the rear wheel and drive assembly. The frame side rails 12 and 14 are also swept inwardly near the front and rear, as at 22 and 24 respectively, to accommodate the wheel assemblies and to dispose the side rails further outboard between the vehicle wheels.

Frame cross braces 26, 28, 30 and 32 are secured between the side rails 12 and 14. The frame side members 12 and 14 and cross members 26, 28, 30 and 32 are preferably box or tubular sections being made from two channel members lap welded together. The front suspension assembly 18 acts as the forward frame crossrail and is braced by supports 34 and 36 and longitudinal frame rails 38 and 40. The latter rails, 38 and 40, are secured to the frame cross brace or rail 26 and join the side rails at the inswept section 22 with a portion thereof continuing forward as at 41 with the side rails 12 and 14 to engage the front suspension assembly 18. Crossrails 28 and 30 are secured between the side rails 12 and 14 at the rear kick-up 20. The one rail 28 is box sectioned as mentioned, and is spread at its ends, as at 42 and 44, to engage the side rails at different positions for greater structural strength. The rear cross member 32 is secured to the side rails and includes fillets 46 and 48.

The front wheel suspension assembly 18 includes the wishbone arms 50 and 52 supporting the vehicle wheels 54 and 56. The engine 58 is supported at the front by assembly 18 and near the rear by supports 60 secured to the frame rails 38 and 40, one of which is shown in the cutaway part of Figure 1. The propeller drive shaft 62 is connected to the transmission end 64 of the engine 58 through a universal joint 66 disposed over the frame crossrail 26. The drive shaft 62 is connected through another universal joint 68 below crossrail 28 to the differential housing 70 for transmitting drive to the rear axle 72 and rear wheels 74 and 76.

The rear axle shaft 72 and differential are supported by leaf springs 78 and 80 between rear spring shackles 82 hung below the rear frame cross member 32 and shackles not shown but supported by outriggers 83 and 84 secured to the frame side rails 12 and 14 and extended within the frame. Hangers 86 and blocks 88 secure the axle shaft 72 to the springs. Shock absorbers 90 are secured between the springs 78 and 80 and frame crossrail 28. A differential bumper member 92 is secured to the crossrail 28 and is disposed to engage and limit vertical travel of the differential housing 70.

The exhaust conduits 94 and 96 are connected to the exhaust manifolds of the engine 58 on each side thereof and extend under the engine supports 60, around the transmission end 64 of the engine and follow the drive shaft 62 rearwardly. The conduits 94 and 96 are then extended towards the sides of the chassis and formed with the frame rear kick-ups 20 up and over the rear axle shaft 72. The conduits connect into opposite ends of an exhaust muffler 98 disposed transversely of the chassis and secured to the frame cross member 30. The intermediate portion of the exhaust conduits 94 and 96 may be secured to the frame members or vehicle underbody as desired. Tail pipes 100 and 102 are connected to the muffler 98 and extend rearwardly under the rearmost cross member 32. The cross member 32 as elevated slightly will be noted to accommodate the tail pipes thereunder.

The engine fuel tank 104 is mounted upon the frame side rails 12 and 14 and is extended therebetween on top of the frame rear kick-ups 20. The tank 104 is also supported by the frame cross members 28 and 30 and has its underside saddle shaped to conform with the curvature of the side rails as extended over the axle shaft 72. The tank filler neck 106 is located near the top of the tank.

In the drawings the vehicle underbody 108 is shown separately as mounted to the vehicle frame 10. However, the underbody may be an integral part of the vehicle body if desired. The underbody 108 is of sheet metal material formed near the front end to provide the toe board 110 and firewall 112 and near the rear end to provide the rear wall 114. The underbody 108 extends over the fuel tank 104 and down to form the back wall 116 of the luggage or other compartment as generally provided within the rear end of a vehicle. The toe board 110 and firewall 112 disposed over and adjacent the end of the engine 58 are formed to accommodate the end of the engine, as at 118 and 120, respectively. A drive shaft tunnel 122 is formed over the drive shaft 72.

The sides of the underbody 108 which are disposed over the frame side rails 12 and 14 are formed to provide channeled sections 124 and 126 receiving the side rails therein. In the drawings the channeled sides 124 and 126 of the underbody are shown to be formed by having a side plate 128 secured to the side edges of the underbody and extended the length thereof. The side plates 128 are secured to the underbody 108 by a flange 130, extend down parallel to the side rail, and are bent out, down and in to provide a strengthening rib 132.

The underbody 108 is secured to the frame side rails 12 and 14, as shown by Figures 3 and 5–7, and to the longitudinal frame rails 38 and 40, as shown by Figure 4. Shelf-type brackets 134 are used at the forward and rear securing positions, as shown by Figures 3 and 7, respectively.

Referring to Figure 3, the side rail 12 includes channel rails 136 and 138 lap welded together to form the box or tubular cross-section. A sleeve member 140 is extended through the side rail 12 to provide a tie bolt access 142 through the frame rail. The underbody 108 includes the channeled side section 124 formed by having a stepped top rail or sill 144 secured to the floor panel 146 and the side plate 128 secured to the top rail. Bracket 134 is secured to the underbody 108 on one side of the side rail 12 adjacent the tie bolt access 142 and a hat section nut holder 148 on the other side thereof. The nut holder 148 is secured to the top rail 144 and rib 132 and positions a threaded nut member 150 in position to receive the tie bolt 152. The tie bolt 152 extends through bracket 134, access 142 and side plate and is threaded through the fixed nut 150. A U-shaped pad 154 is disposed between the side rail 12 and channeled section 124 of the underbody and is provided with accesses 156 and 158 on opposite sides of the side rail, and spacers 160 and 162, through which the tie bolt 152 extends, to retain the pad in position. The pad 154 is of resilient material, preferably rubber or the like, which will absorb shock forces and vibrations received by the vehicle frame and prevent their transmission to the underbody 108.

Figures 5–7 are disclosures of the other underbody securing means wherein similar members are designated by the same numerals. In Figure 5 the shelf bracket 134 is not used and the tie bolt 152 is not engaged with the underbody 108 on the inner side of the side rail 12. Figure 6 shows a mounting wherein the underbody 108 extends down to the lower limit of the side rail 12 or below. A depression 164 is provided within the underbody wherein the tie bolt 152 is received and a cupped washer 166 is used to receive the head of the tie bolt in an unobstructive manner. Although not shown in these drawings, floor carpeting covers the underbody and would hide this particular fastening means.

Figure 4 shows the fastening of the underbody 108 to the longitudinal frame rails 38 and 40. A short bolt 168 is received through an access 170 provided within a depression 172 in the floor panel 146 and a cupped washer 174 and pad 176 receive the bolt over the rail 38, while a spacer 178, lock washer 180 and threaded nut 182 are received on the threaded end of the bolt within the rail. An opening 184 is provided through the bottom wall of the rail 38 to allow access to the nut 182 for tightening it down.

An optional underbody mounting is shown by Figure 8 wherein the channel sections 124 and 126 of the underbody are formed by a plurality of spaced supports 186 secured to the underbody 108 and formed to wrap the frame rail 12 at the selected mounting position. The support is also formed to provide a rocker panel brace 188, shown broken away in the drawing, which folds back upon itself as at 190. The support 186, and consequently the underbody 108, is secured to the frame rail 12 by a tie bolt 192 extending through the frame and received by a threaded nut 194 held to the support by a retainer 196. Openings 198 and 200 are formed through the bracket and underbody, respectively, adjacent the head of the tie bolt 192, to provide access thereto. Separate pads 202 and 204 are disposed between the support 186 and frame rail 12 in place of the U-shaped pad 154. A shim 206 is secured to the top of frame rail 12 and provides a flat seat for pad 204. The pad 204 may be bonded or otherwise secured to either the inside of the support 186 or top of the frame rail 12 as desired.

Referring now to Figure 2, the channeled section 124 of the underbody 108 has not been shown in order to more clearly show the general layout of the underbody 108 as mounted upon the vehicle frame 10. The toe board 110 is reinforced by a brace 208 secured thereto and to a conventional type body mounting member 210 secured to the frame rail 12. The front compartment floor 212 is disposed slightly below the top of the frame rail 12 and extends from the edge of the toe board 110 to the seat rest 214. The front compartment floor 212 is also supported by the longitudinal frame rails 38 and 40. Just after the seat rest 214 the floor slopes downward, as at 216, to the rear compartment floor 218. The underbody is then formed to provide the rear seat rest 220 and seat back 114 and a cover 222 for the fuel tank 104. A trunk compartment floor panel 224 is secured to the end crossrail 32 and extended forward to engage and be secured to the underbody. The floor panel 224 and underbody are supported at their junction by conventional body mounts 226 secured to the frame rails 12 and 14.

We claim:

1. A vehicle frame and underbody assembly including a frame member having spaced side rails, an underbody formed to provide a compartment floor pan and including channeled side members supported upon said side rails, means for securing said underbody to said side rails and for disposing said floor pan below the tops of said side rails, a drive shaft tunnel formed from said underbody and extended centrally the length of said floor pan, exhaust means housed within said drive shaft tunnel, an exhaust muffler connected to said exhaust means and secured to said frame transversely between said side rails and near the ends thereof to allow for a lower compartment floor level.

2. A vehicle frame and underbody assembly including a frame member having spaced side rails which are swept up near the front ends thereof and kicked up near the rear ends thereof to accommodate vehicle wheel assemblies, said side rails being formed intermediate the ends thereof to extend outwardly between the front and rear vehicle wheels of said wheel assemblies, a vehicle underbody including channeled side members received upon said side rails, said underbody being formed to provide a compartment floor pan, means for securing said underbody to said side rails for disposing said floor pan below the level of said side rails, an engine fuel tank mounted upon said frame and between said side rails upon the rear kick-up thereof, said underbody being formed over said fuel tank for shielding said tank from damage as disposed upon said side rails, and exhaust means secured to said frame transversely between said side rails and beneath said fuel tank, said fuel tank and exhaust means being disposed to minimize obstruction to said floor pan allowing a lower vehicle floor level.

3. Means for mounting a vehicle body member, including an underbody, to a vehicle frame member having spaced side rails and for disposing said underbody between and below the upper edges of said side rails which includes, a plurality of channeled support members adapted to be secured at spaced intervals to the sides of said underbody and which are formed to be received over said frame side rails, mounting pads adapted to be disposed between said channeled support members and said frame side rails, and means for securing said channeled support members to said side rails for retaining said vehicle body upon said vehicle frame and for disposing said underbody beneath the top level of said side rails.

4. Means for mounting a vehicle body, including an underbody, to a vehicle frame including spaced side rails and for disposing said underbody between and below the upper edges of said side rails which includes, channeled support members adapted to be secured at spaced intervals to the sides of said underbody, said channeled support members being adapted to be received upon said frame side rails and being formed to provide rocker panel reinforcing means adjacent the outer surfaces of said side rails, and means for securing said support members to said side rails for disposing said underbody beneath the upper level of said side rails.

5. A combination vehicle frame and underbody assembly including a vehicle frame having box-sectioned parallel spaced side rails and side rail connecting cross braces near opposite ends of the passenger compartment area of said frame, a vehicle underbody formed to include walls extending transversely of said side rails to provide greater structural rigidity to said underbody within said passenger compartment area, and inverted channel-sectioned members formed near the outer edges of said underbody and adapted to be received over said frame side rail disposing said underbody below the upper edge of said side rails, said inverted channel-sectioned members being secured to said frame member by fastening means extending through the outermost flange of said channel members and horizontally through said side rails and having resilient body mounting pads disposed therein for isolating said underbody from drive and other noises transmitted through said frame.

6. A vehicle underbody-to-frame mounting including a vehicle underbody having the outer side edges thereof formed to provide inverted channel-sectioned members disposed and proportional for cooperation with side rail members of a vehicle frame, said channel-sectioned members as received upon said frame side rails disposing the floor pan portion of said underbody below the plane of the upper edge of said side rails and having the outermost flange thereof extending adjacent the outer side wall of said frame side rails, resilient body mounting pads disposed within said channel-sectioned member for isolating said underbody from road and other noises received by said frame, and body mounting bolts extended through said outermost channel member flange and horizontally through said frame side rails for securing said underbody thereto.

7. The vehicle underbody-to-frame mounting of claim 6 wherein said channel sectioned members are provided at spaced intervals along the side edge of said underbody.

8. The vehicle underbody-to-frame mounting of claim 6 wherein said body mounting bolts extend through both flanges of said channel-sectioned members to more securely retain said underbody to said frame.

9. The vehicle underbody-to-frame mounting of claim 6 wherein the innermost flange of said channel-sectioned members is shorter than said outermost flange and an angle bracket is secured to said underbody floor pan portion immediately next adjacent said shorter flange and to said frame side rail by said body mounting bolts as received therethrough.

References Cited in the file of this patent

UNITED STATES PATENTS

| | | |
|---|---|---|
| 1,468,241 | Larsen | Sept. 18, 1923 |
| 1,781,503 | Ford | Nov. 11, 1930 |
| 1,788,732 | Moorhouse | Jan. 13, 1931 |
| 1,789,238 | Lancia | Jan. 13, 1931 |
| 1,826,125 | Cripps | Oct. 6, 1931 |
| 1,934,136 | Miner | Nov. 7, 1933 |
| 2,111,563 | Kliesrath | Mar. 22, 1938 |
| 2,188,879 | Ledwinka | Jan. 30, 1940 |
| 2,268,291 | Ledwinka et al. | Dec. 30, 1941 |
| 2,301,330 | Schafer | Nov. 10, 1942 |
| 2,389,907 | Helmuth | Nov. 27, 1945 |
| 2,529,995 | Brezek | Nov. 14, 1950 |
| 2,613,986 | Heyl | Oct. 14, 1952 |
| 2,662,793 | Lindsay | Dec. 15, 1953 |

FOREIGN PATENTS

| | | |
|---|---|---|
| 940,185 | France | May 10, 1948 |
| 822,936 | Germany | Nov. 29, 1951 |
| 743,439 | Germany | Dec. 27, 1943 |